No. 857,738. PATENTED JUNE 25, 1907.
H. R. KARSTENS.
MACHINE FOR MAKING LATH BOARDS.
APPLICATION FILED JULY 12, 1906.
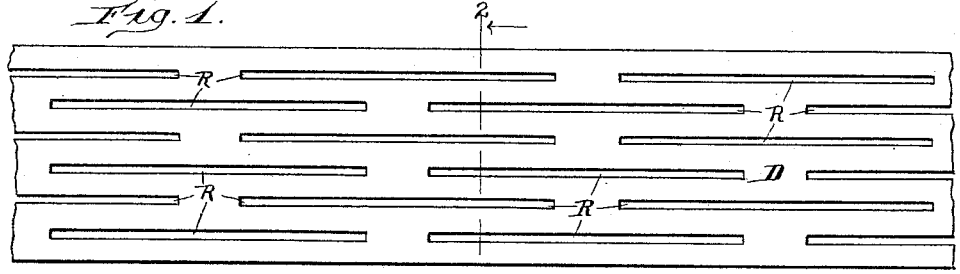
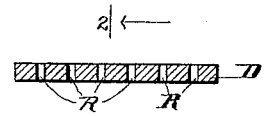
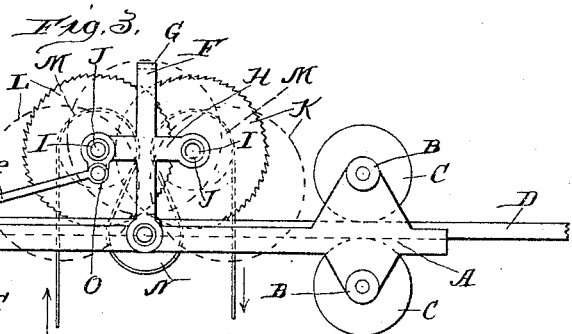
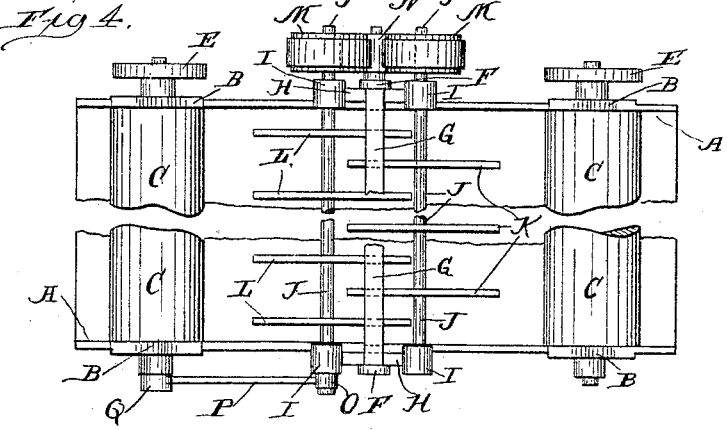
Witnesses:
Chas. E. Gorton
E. J. Boileau
Inventor:
Herman R. Karstens
by Rudolph Wm. Lotz

UNITED STATES PATENT OFFICE.

HERMAN R. KARSTENS, OF LADYSMITH, WISCONSIN.

MACHINE FOR MAKING LATH-BOARDS.

No. 857,738.　　　　Specification of Letters Patent.　　　　Patented June 25, 1907.

Application filed July 12, 1906. Serial No. 325,822.

*To all whom it may concern:*

Be it known that I, HERMAN R. KARSTENS, a citizen of the United States, residing at Ladysmith, in the county of Rusk and State of Wisconsin, have invented certain new and useful Improvements in Machines for Making Lath-Boards; and I do hereby declare the following to be a full, clear, and exact description of the invention, such as will enable others skilled in the art to which it appertains to make and use the same.

My invention relates to the novel construction of a machine for manufacturing what are known as lath boards, that is boards provided with relatively staggered rows of longitudinal slots, the object being to provide a machine whereby such boards are produced at relatively small cost and in any desired lengths, and consists in the features of construction and combinations of parts hereinafter fully described and claimed.

In the accompanying drawings illustrating my invention: Figure 1 is a view in elevation of a portion of a lath board constructed in accordance with my invention. Fig. 2 is a transverse section of the same on the line 2 2 of Fig. 1. Fig. 3 is a side elevation of a machine constructed in accordance with my invention, the supporting frame being omitted. Fig. 4 is a top plan view of the same.

My said invention consists of a frame A provided adjacent its ends with two sets of bearings B in which two pairs of opposing rollers C are journaled and between which the board D to be cut is adapted to pass, one of the said rollers of each set being driven, and being to this end geared to a source of power in any suitable manner, as for example, by means of the pulleys E. Pivotally mounted on said frame A, practically midway between the ends thereof, is an oscillating frame consisting of two side bars F connected together by means of a cross bar G. The said side bars are provided between their ends on opposite sides with projections H in which are journals I for shafts J on which rotary saws K and L, respectively, are rigidly mounted. The said saws K and L are disposed in relatively staggered relation on said shafts J and the latter are driven by a single belt trained over the pulleys M rigid therewith and over an idler N having its access of rotation coincident with the access of oscillation of said frame F—G and by means of which said saws are geared to a source of power. Disposed upon the free end of one of said projections H of said frame F—G is a projection O which is connected by means of a pitman P with the crank Q of one of said driven rollers C, the latter serving during its rotation to impart oscillatory motion to the said frame F—G.

In operation the board to be slotted, which is illustrated in Figs. 1 and 2, is passed between said rollers C and into the path of the said saws K and L. While said board is passing through the machine the said saws are alternately brought into and out of operative relations to the board respectively by the oscillation of the frame F—G thus producing or cutting longitudinal slots R in said board D, said slots being disposed in staggered relation to each other as previously stated. The length of said slots, their distance apart, and the width thereof are obviously dependent upon the duration of the oscillating movements of the saws, their relative position and thickness, and these may be arranged as desired by the manufacturer.

My said machine is very simple and efficient, and the lath board produced is very advantageous by reason of the fact that the openings for the reception of plaster are of the pre-determined width and not dependent upon the eye of the lather, and furthermore for the reason that a large surface can be covered at a single operation, thus enabling the lather to cover a greater surface in a given space of time than by the use of the laths now employed.

I claim as my invention—

1. In a machine of the class described, a supporting frame, feeding rollers arranged in pairs spaced apart and mounted for rotation upon said supporting frame, above and below the path of the material thereon means for rotating said feeding rollers, a frame mounted above the table and pivoted thereto at its lower end, and constituting a supporting frame and carrying shafts spaced apart and extending transversely of the supporting frame, saws carried by said shafts with the saws of one shaft arranged intermediate of those upon the other shaft, means for simultaneously rotating said saw shafts, and means whereby the rotary motion of said rollers is caused to oscillate said swinging frame.

2. In a machine of the class described, a supporting frame, means carried by said supporting frame for feeding the material thereover, a frame formed of spaced side members pivoted at their lower ends to said supporting frame and connected by a transverse member and spaced from said supporting frame and with arms extending laterally from said side members, shafts spaced apart and journaled respectively in said arms, saws carried by said shafts with the saws of one shaft arranged intermediate of those upon the other shaft, means for simultaneously rotating said shafts, and means for intermittently vibrating said pivoted saw carrying frame.

3. A machine of the class described, a supporting frame, feed rollers arranged in pairs and spaced apart and mounted for rotation upon said supporting frame above and below the path of the material moving thereover, and with a relatively long crank arm upon the journal of one of said rollers, a frame formed of a transverse member and spaced side members pivoted at one end to said supporting frame and extending above the same, and with arms extending laterally from said side members, shafts spaced apart and journaled respectively in said arms, saws carried by said shafts with the saws of one shaft arranged intermediate to those of the other shaft, a relatively short crank arm upon one of said shafts, and a connecting rod between said crank arms.

In testimony whereof I have signed my name in presence of two subscribing witnesses.

HERMAN R. KARSTENS.

Witnesses:
 THEO. M. THOMAS,
 M. SINCLAIR.